United States Patent
Kirkegaard et al.

(10) Patent No.: US 10,883,478 B2
(45) Date of Patent: Jan. 5, 2021

(54) WIND TURBINE BLADE INCLUDING PROTECTIVE COVER

(71) Applicant: POLYTECH A/S, Bramming (DK)

(72) Inventors: Mads Kirkegaard, Bramming (DK); Thomas Gliese, Bramming (DK)

(73) Assignee: POLYTECH A/S, Bramming (DK)

( * ) Notice: Subject to any disclaimer, the term of this patent is extended or adjusted under 35 U.S.C. 154(b) by 15 days.

(21) Appl. No.: 16/098,718

(22) PCT Filed: Sep. 13, 2016

(86) PCT No.: PCT/IB2016/001297
§ 371 (c)(1),
(2) Date: Nov. 2, 2018

(87) PCT Pub. No.: WO2018/051153
PCT Pub. Date: Mar. 22, 2018

(65) Prior Publication Data
US 2019/0195202 A1      Jun. 27, 2019

(51) Int. Cl.
| | |
|---|---|
| *F03D 80/00* | (2016.01) |
| *B29C 65/00* | (2006.01) |
| *B29C 65/18* | (2006.01) |
| *B29C 65/48* | (2006.01) |
| *F03D 1/06* | (2006.01) |

(Continued)

(52) U.S. Cl.
CPC .............. *F03D 80/00* (2016.05); *B29C 65/18* (2013.01); *B29C 65/485* (2013.01);
(Continued)

(58) Field of Classification Search
CPC .......... F03D 80/00; F03D 1/06; F03D 1/0675; F05B 2230/60; F05B 2230/80; F05B 2230/90; F05B 2280/4003; F05B 2280/5002; Y02P 70/523; Y02E 10/721; B29C 65/18; B29C 65/4835; B29C 65/485; B29C 66/1122; B29C 66/326;
(Continued)

(56) References Cited

U.S. PATENT DOCUMENTS

| | | | |
|---|---|---|---|
| 2007/0036659 A1* | 2/2007 | Hibbard | B29C 66/1282 416/233 |
| 2010/0028160 A1* | 2/2010 | Schaeffer | F01D 5/005 416/224 |

(Continued)

FOREIGN PATENT DOCUMENTS

| | | |
|---|---|---|
| CN | 201786551 U | 4/2011 |
| CN | 103890382 A | 6/2014 |

(Continued)

*Primary Examiner* — Aaron R Eastman
(74) *Attorney, Agent, or Firm* — Dinsmore & Shohl LLP

(57) ABSTRACT

A wind turbine blade includes a protective cover attached along the blade by a layer of adhesive. The adhesive is a general purpose adhesive, and the adhesive forms a joint or sealing between an outer edge of the cover section of the blade and the surface of the blade so that the outer edge is covered by the adhesive and so that the joint forms an oblique surface from the outer edge to the surface of the blade. The joint has a first height at the outer edge and a second height at the position where it ends at the surface of the blade. The second height is smaller than the first height and smaller than 0.2 millimetres, and the joint is integrally formed with the layer of adhesive.

21 Claims, 6 Drawing Sheets

(51) Int. Cl.
*B29C 65/78* (2006.01)
*B29L 31/08* (2006.01)

(52) U.S. Cl.
CPC ...... *B29C 65/4835* (2013.01); *B29C 66/1122* (2013.01); *B29C 66/326* (2013.01); *B29C 66/532* (2013.01); *B29C 66/81455* (2013.01); *F03D 1/06* (2013.01); *F03D 1/0675* (2013.01); *B29C 65/7847* (2013.01); *B29C 66/71* (2013.01); *B29L 2031/085* (2013.01); *F05B 2230/60* (2013.01); *F05B 2230/80* (2013.01); *F05B 2230/90* (2013.01); *F05B 2280/4003* (2013.01); *F05B 2280/5002* (2013.01); *Y02E 10/72* (2013.01); *Y02P 70/50* (2015.11)

(58) Field of Classification Search
CPC ............ B29C 66/532; B29C 66/81455; B29C 65/7847; B29C 66/71
See application file for complete search history.

(56) References Cited

U.S. PATENT DOCUMENTS

| | | | |
|---|---|---|---|
| 2010/0143722 A1* | 6/2010 | Anderson | C09J 5/00 428/411.1 |
| 2010/0276064 A1* | 11/2010 | Blanchard | B29C 65/526 156/94 |
| 2011/0243751 A1 | 10/2011 | Fritz et al. | |
| 2017/0314532 A1* | 11/2017 | Kirkegaard | C08G 18/7671 |

FOREIGN PATENT DOCUMENTS

| | | |
|---|---|---|
| EP | 2559891 A2 | 2/2013 |
| EP | 2927482 A1 | 10/2015 |
| JP | 2002054296 A | 2/2002 |
| JP | 2002224944 | 8/2002 |
| WO | 2004076852 A2 | 9/2004 |
| WO | 2016075619 A1 | 5/2016 |

\* cited by examiner

WIND TURBINE BLADE INCLUDING PROTECTIVE COVER

CROSS-REFERENCE TO RELATED APPLICATIONS

This application is the U.S. national stage of PCT/IB2016/001297 filed Sep. 13, 2016, of which is hereby incorporated by reference in its entirety.

FIELD OF THE INVENTION

The present invention relates to a wind turbine blade including a protective cover, wherein the protective cover is made of a polymer material, such as a polyether based polyurethane, wherein the protective cover is attached along at least a part of a longitudinal edge of the wind turbine blade by a layer of adhesive arranged between an inside of the protective cover and a surface of the longitudinal edge of the wind turbine blade, wherein the protective cover is elongated in a longitudinal direction and has an at least substantially U-formed cross-section, wherein the protective cover includes a central cover section extending in the longitudinal direction and two peripheral cover sections extending in the longitudinal direction at either side of the central cover section and each having an outer edge, respectively, wherein the central cover section has a minimum thickness of at least 1 millimetre, and wherein each peripheral cover section has a thickness decreasing from a maximum thickness of at least 1 millimetre to a minimum thickness at its outer edge of less than 1 millimetre.

BACKGROUND OF THE INVENTION

EP 2 927 482 A1 discloses a wind turbine blade provided with an erosion shield. The erosion shield is arranged across the bond line of a pressure side shell part and a suction side shell part and comprises an inner layer made of a polyurethane material reinforced with aramid fibres, an outer layer made of a UV resistant coating layer, and an intermediate primer layer. A sealant is arranged at the sides of the erosion shield in order to provide a smooth aerodynamic surface and to improve the adhesion the outer surface of the blade. The sealant may be separately provided, or it may for instance be part of the UV resistant coating layer.

US 2011/0243751 A1 discloses a wind turbine blade including an upper shell member and a lower shell member joined at leading and trailing edges of the blade with a bond material. Portions of the bond material are externally exposed. The leading edge bond may utilize a bond cap applied over the external shell member surfaces with a suitable adhesive material. A filler material may be used at the transition region between the bond cap and the shell members to define a smooth, blended transition region.

WO 2016/075619 A1 (Polytech A/S) discloses a preformed protective cover for a wind turbine blade is made of a polymer material, such as a polyether based polyurethane, which is adapted to be attached along at least a part of a longitudinal edge of the wind turbine blade by adhesion of an inside of the preformed protective cover to a surface of the longitudinal edge of the wind turbine blade. The preformed protective cover is elongated in a longitudinal direction and has an at least substantially U-formed cross-section. The adhesion is performed by providing an adhesive, such as a two component polyurethane adhesive, on the inside of the preformed protective cover, pressing the inside of the preformed protective cover against the surface of the longitudinal edge of the wind turbine blade, and removing excess adhesive leaking between each peripheral cover section and the surface of the longitudinal edge of the wind turbine blade.

However, according to prior art solutions, the transition area between a protective cover and the surface of the wind turbine blade may be problematic, because even the slightest unevenness may cause deterioration and/or delamination of the materials involved as a result of the large aerodynamic forces at work during operation of the wind turbine blade.

SUMMARY OF THE INVENTION

The object of the present invention is to provide a wind turbine blade including a protective cover being more resistant against wear in the transition area between the protective cover and the surface of the wind turbine blade than prior art solutions.

In view of this object, the adhesive is a general purpose adhesive, such as a two component epoxy adhesive, having thixotropic and UV resistant properties, the adhesive forms a joint between the outer edge of each peripheral cover section and the surface of the longitudinal edge of the wind turbine blade so that the outer edge is at least substantially completely covered by the adhesive over its entire thickness and so that the joint forms an oblique surface from the outer edge of each peripheral cover section to the surface of the longitudinal edge of the wind turbine blade, the joint has a first height at the outer edge and a second height at the position where it ends at the surface of the longitudinal edge of the wind turbine blade, the second height is smaller than the first height and smaller than 0.2 millimetres, preferably smaller than 0.1 millimetres, and the joint is integrally formed with the layer of adhesive arranged between the inside of the protective cover and the surface of the longitudinal edge of the wind turbine blade.

Thereby, by forming the joint between the edge of the protective cover and the surface of the wind turbine blade as a very smooth transition without significant steps, and by forming the joint integrally with the adhesive layer bonding the protective cover to the surface of the wind turbine blade, a very strong transition area between the protective cover and the surface of the wind turbine blade may be obtained.

Preferably, the first height is greater than 0.250 millimetres and preferably greater than 0.5 millimetres. Thereby, a suitable thickness of the outer edge of each peripheral cover section may be obtained in order to ensure a good bond between the outer edge and the adhesive forming the joint.

In an embodiment, the joint has a width from the outer edge of the peripheral cover section to the position where it ends at the surface of the longitudinal edge of the wind turbine blade, and wherein said width is between 2 and 5 millimetres. Thereby, a suitable smooth transition between the protective cover and the surface of the wind turbine blade may be obtained.

In an embodiment, a first side of a double-sided adhesive transfer tape is adhered to the inside of the protective cover, and a second side of the double-sided adhesive transfer tape is adhered to the surface of the longitudinal edge of the wind turbine blade. Thereby, the protective cover may be positioned provisionally on the wind turbine blade in the correct position, before the adhesive is applied.

In an embodiment, the first side of the double-sided adhesive transfer tape is adhered to the inside of the protective cover at least substantially along a central axis of the protective cover. Thereby, advantageously, the adhesive may be applied on the inside of the protective cover and/or on the surface of the longitudinal edge of the wind turbine blade in that it is firstly applied at a first side in relation to the double-sided adhesive transfer tape and secondly applied at a second side in relation to the double-sided adhesive transfer tape.

The present invention further relates to a method of providing a wind turbine blade with a protective cover, whereby the protective cover is made of a polymer material, such as a polyether based polyurethane, whereby the protective cover is attached along at least a part of a longitudinal edge of the wind turbine blade, whereby the protective cover is elongated in a longitudinal direction and has an at least substantially U-formed cross-section, whereby the protective cover includes a central cover section extending in the longitudinal direction and two peripheral cover sections extending in the longitudinal direction at either side of the central cover section and each having an outer edge, respectively, whereby the central cover section has a minimum thickness of at least 1 millimetre, and wherein each peripheral cover section has a thickness decreasing from a maximum thickness of at least 1 millimetre to a minimum thickness at its outer edge of less than 1 millimetre, and whereby the attachment procedure includes the following steps:

providing an adhesive, such as a two component epoxy adhesive, on an inside of the protective cover, pressing the inside of the protective cover against a surface of the longitudinal edge of the wind turbine blade, removing excess adhesive leaking between each peripheral cover sections and the surface of the longitudinal edge of the wind turbine blade.

The method is characterised by that the adhesive is a general purpose adhesive, such as a two component epoxy adhesive, having thixotropic and UV resistant properties, and by that the attachment procedure includes the following steps:

before application of the protective cover on the wind turbine blade, provisionally adhering a masking tape on the surface of the longitudinal edge of the wind turbine blade along and at a distance from the outer edge of each peripheral cover section, the masking tape having a thickness of less than 0.2 millimetres, preferably less than 0.1 millimetres, after application of the protective cover on the wind turbine blade, scraping excess adhesive leaking between each peripheral cover section and the surface of the longitudinal edge of the wind turbine blade, and removing the masking tape from the surface of the longitudinal edge of the wind turbine blade.

Thereby, a joint between the edge of the protective cover and the surface of the wind turbine blade may be formed as a very smooth transition without significant steps, and the joint may be formed integrally with the adhesive layer bonding the protective cover to the surface of the wind turbine blade, whereby a very strong transition area between the protective cover and the surface of the wind turbine blade may be obtained.

In an embodiment, the minimum thickness at the outer edge of each peripheral cover section is greater than 0.250 millimetres and preferably greater than 0.5 millimetres. Thereby, the above-mentioned features may be obtained.

In an embodiment, the distance of the provisionally adhered masking tape from the outer edge of each peripheral cover section is between 2 and 5 millimetres. Thereby, the above-mentioned features may be obtained.

In an embodiment, before application of the protective cover on the wind turbine blade, a first side of a double-sided adhesive transfer tape is adhered to the inside of the protective cover, and whereby, before providing adhesive on the inside of the protective cover, a second side of the double-sided adhesive transfer tape is adhered to the surface of the longitudinal edge of the wind turbine blade. Thereby, the above-mentioned features may be obtained.

In an embodiment, the first side of the double-sided adhesive transfer tape is adhered to the inside of the protective cover at least substantially along a central axis of the protective cover. Thereby, the above-mentioned features may be obtained.

In an embodiment, the adhesive is applied on the inside of the protective cover or on the surface of the longitudinal edge of the wind turbine blade in that it is firstly applied at a first side in relation to the double-sided adhesive transfer tape and secondly applied at a second side in relation to the double-sided adhesive transfer tape.

In an embodiment, before applying the adhesive at the second side of the double-sided adhesive transfer tape, the protective cover is pressed against the surface of the longitudinal edge of the wind turbine blade at the first side of the double-sided adhesive transfer tape.

DETAILED DESCRIPTION OF THE INVENTION

Figure 1:
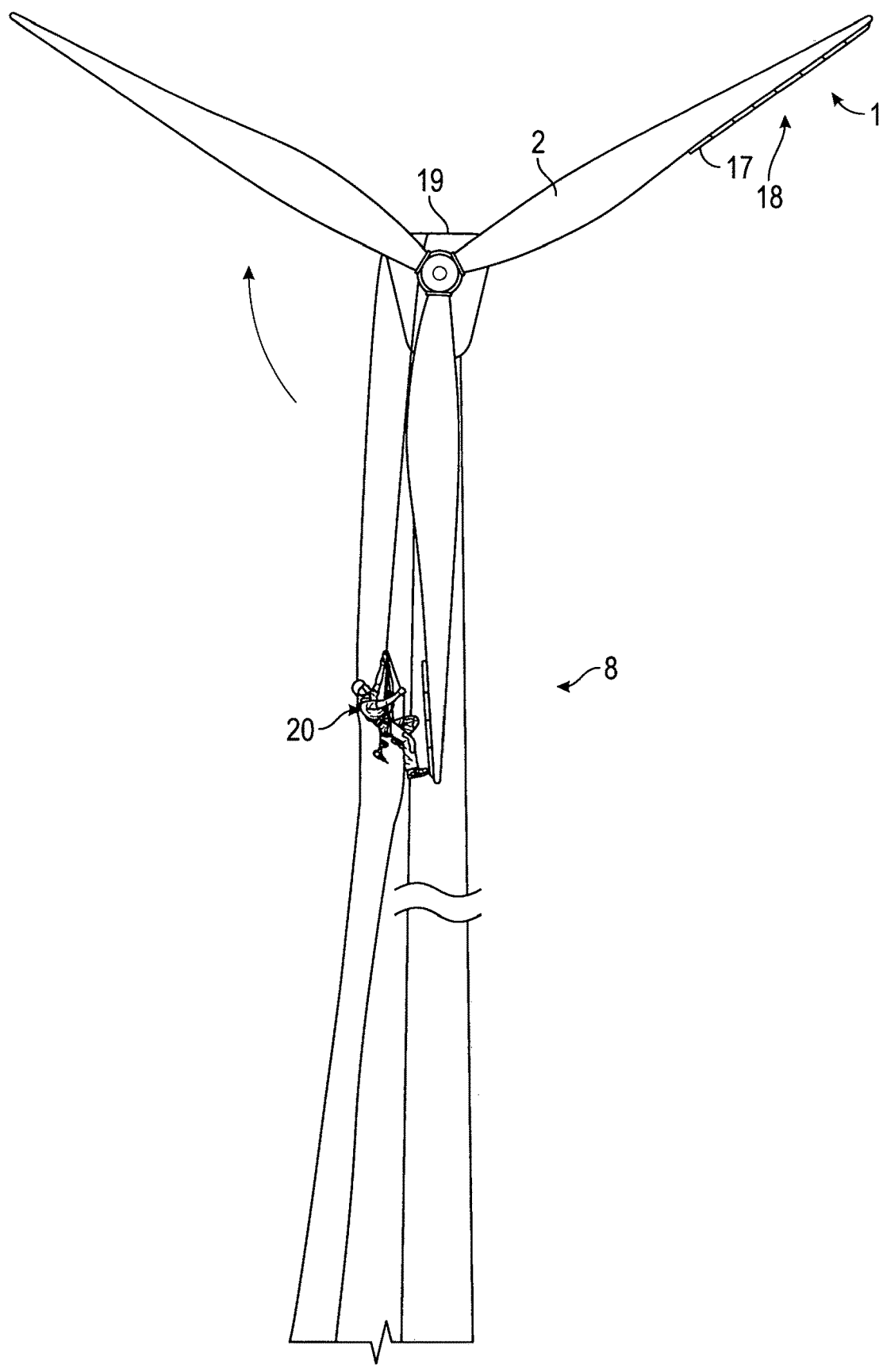
FIG. 1 illustrates a method of providing wind turbine blades mounted on a wind turbine with protective covers.

FIG. 1 illustrates a method of providing wind turbine blades 2 mounted on an existing wind turbine 8 with protective covers 1. As it is seen, the method may be carried out by only one service technician 20 by means of rope access, whereby the service technician climbs down from the nacelle 19 by means of ropes.

Figure 2:
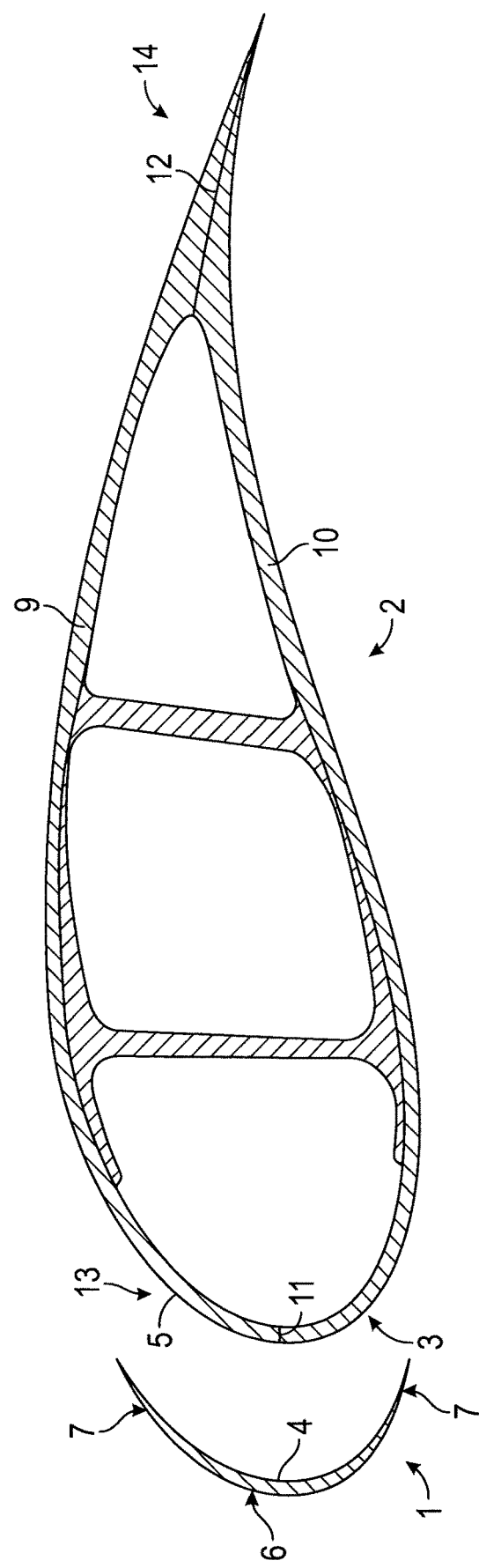
FIG. 2 illustrates a cross-section through a wind turbine blade and a protective cover before attachment to the wind turbine blade.

FIG. 2 shows in cross-section a protective cover 1 of a preformed type for a wind turbine blade 2, wherein the preformed protective cover 1 is made of a polymer material, such as a polyether based polyurethane. The preformed protective cover 1 is adapted to be attached along at least a part of a longitudinal edge 3 of the wind turbine blade 2 by adhesion of an inside 4 of the preformed protective cover 1 to a surface 5 of the longitudinal edge 3 of the wind turbine blade 2. The preformed protective cover 1 is elongated in a longitudinal direction D and has an at least substantially U-formed cross-section. The preformed protective cover 1 includes a central cover section 6 extending in the longitudinal direction D and two peripheral cover sections 7 extending in the longitudinal direction at either side of the central cover section 6, respectively. The central cover section 6 may have a minimum thickness of at least 1 millimetre, and each peripheral cover section 7 may have a thickness decreasing from a maximum thickness of at least 1 millimetre to a minimum thickness of for instance less than ½ millimetre.

The particular form of the peripheral cover sections 7 provides for a good transition from the central cover section of the preformed protective cover 1 to the surface of the wind turbine blade 2. A good transition without edges is of great importance in order to avoid that the wind will destroy the materials or detach the protective cover 1 from the surface of the wind turbine blade 2.

The maximum thickness of each peripheral cover section 7 may correspond to the minimum thickness of the central cover section. The minimum thickness of the central cover section may be at least 2 millimetres, preferably at least 3 millimetres, more preferred at least 4 millimetres and most preferred approximately 5 millimetres.

The thickness of the central cover section 6 may be at least substantially constant from side to side of the central cover section.

The inside of the preformed protective cover 1 may be provided with a number of not shown protrusions having a height of between ½ and 2 millimetres, preferably approximately 1 millimetre. Such not shown protrusions may have the function of ensuring an appropriate layer thickness of adhesive between the preformed protective cover 1 and the surface of the wind turbine blade 2.

As seen in FIG. 2, the preformed protective cover 1 is adapted to be attached along at least a part of the longitudinal edge 3 of the wind turbine blade 2 by adhesion to the surface 5 of the longitudinal edge of the wind turbine blade.

The wind turbine blade 2 may include a first blade shell 9 and a second blade shell 10 joined together to form 2 wind turbine blade along a first longitudinal joint 11 at a leading edge 13 of the wind turbine blade and along a second longitudinal joint 12 at a trailing edge 14 of the wind turbine blade. The preformed protective cover 1 may be attached at the first or second longitudinal joint 11, 12, and preferably at the leading edge 13 of the wind turbine blade. The preformed protective cover 1 may be attached at least approximately symmetrical about the first or second longitudinal joint 11, 12.

The wind turbine blade 2 may be provided with the preformed protective cover 1 as a repair operation, whereby an area of said surface 5 of the longitudinal edge 3 of the wind turbine blade 2 corresponding to the preformed protective cover 1 is machined, such as by grinding or milling, before attachment of the preformed protective cover 1. Thereby, according to the invention, a damaged wind turbine blade 2 may be repaired in an advantageous way. Shortly before application of the protective covers 1 on a wind turbine blade 2, before providing the adhesive on the inside 4 of the preformed protective covers 1, the inside 4 may be provided with a suitable primer, such as for instance SIKA (Registered Trademark). This may for instance be done in the nacelle 19, before the service technician climbs down from the nacelle 19 by means of ropes.

As further seen in FIG. 1, the protective cover 1 of each wind turbine blade 2 is formed by a number of cover sections 17 arranged consecutively along the longitudinal edge 3 of the wind turbine blade 2. Preferably, each cover section 17 slightly overlaps a neighbouring cover section 17. The cover sections 17 are adhered to the wind turbine blade by means of a general purpose adhesive curing at room temperatures or above. The adhesive could for instance be a two component adhesive of the type Cyanoacrylate/Epoxy Hybrid. Before applying cover sections 17 on a section 18 of a wind turbine blade 2, a number of heating devices 15 are arranged on the longitudinal edge 3 of said section 18 of said wind turbine blade 2 consecutively in the longitudinal direction D of the wind turbine blade 2, and heating of the heating devices 15 is activated for preheating of the wind turbine blade consecutively as the heating devices are being arranged on the longitudinal edge 3. The heating devices 15 may have the form of commercially available heating blankets.

After expiration of a predetermined heating period from application of the first heating device 15 on said section 18 of said wind turbine blade 2, the heating devices 15 are consecutively removed or detached at least partly from the longitudinal edge 3 of said section 18 of said wind turbine blade 2 in the same order as they were applied. Thereby, the cover sections 17 are consecutively applied and adhered to the longitudinal edge 3 of said section 18 of the wind turbine blade 2 in pace with the at least partly removal or detachment of the heating devices 15 from the longitudinal edge 3 of said section 18 of the wind turbine blade 2. It should be understood that the heating devices 15 may be longer than cover sections 17. Just as an example, the heating devices 15 could have a length of 1.8 metres in the longitudinal direction of the wind turbine blade 2, when applied thereto, whereas the cover sections 17 may for instance have a length in this direction of 1.0 to 1.1 metres. Therefore, the expression above, "in pace with", should be understood so that when the heating devices 15 are at least partly removed or detached consecutively, a subsequent cover section 17 is generally applied whenever a large enough area in the longitudinal direction of the wind turbine blade 2 is uncovered by the removal of a heating device 15. With the dimensions given just above as example, for instance, after removal of a first heating device 15, only one cover section 17 may be applied. However, after removal of a second heating device 15, two further cover sections 17 may be applied. This is because, in this example, the length of two heating devices 15 correspond to more than the length of three cover sections 17.

The predetermined heating period could for instance be from 1 to 2 hours. In the case that the arrangement and attachment of one heating device 15 on the longitudinal edge 3 of the wind turbine blade 2 takes approximately 10 minutes, this means that 6 to 12 heating devices 15 may be arranged during this predetermined heating period. Figures could differ, especially under cold weather conditions.

Figure 5:
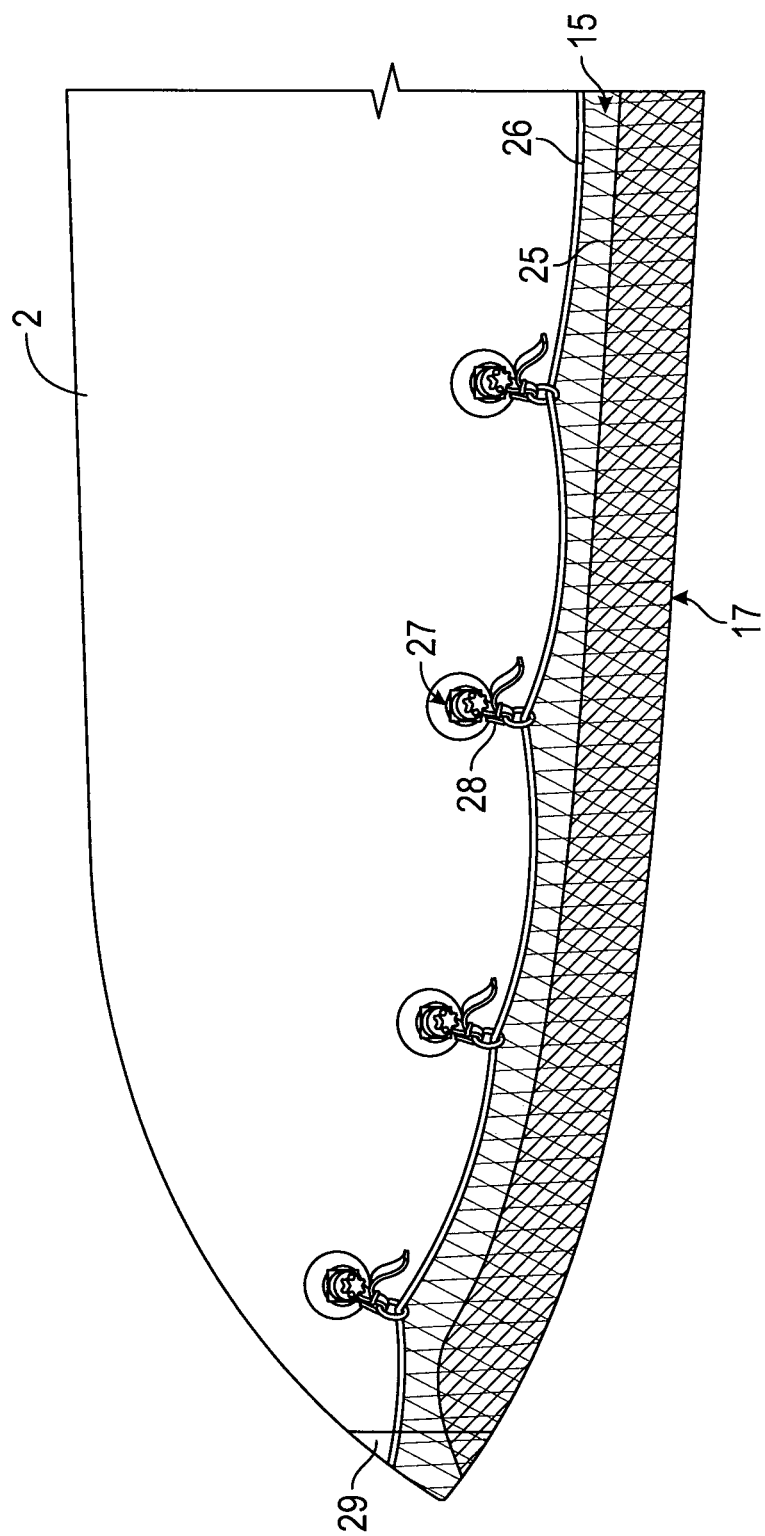
FIG. 5 is a side view of a wind turbine tip part provided with a protective cover maintained in place during adherence by means of a combined fixture and heating device.
Figure 6:
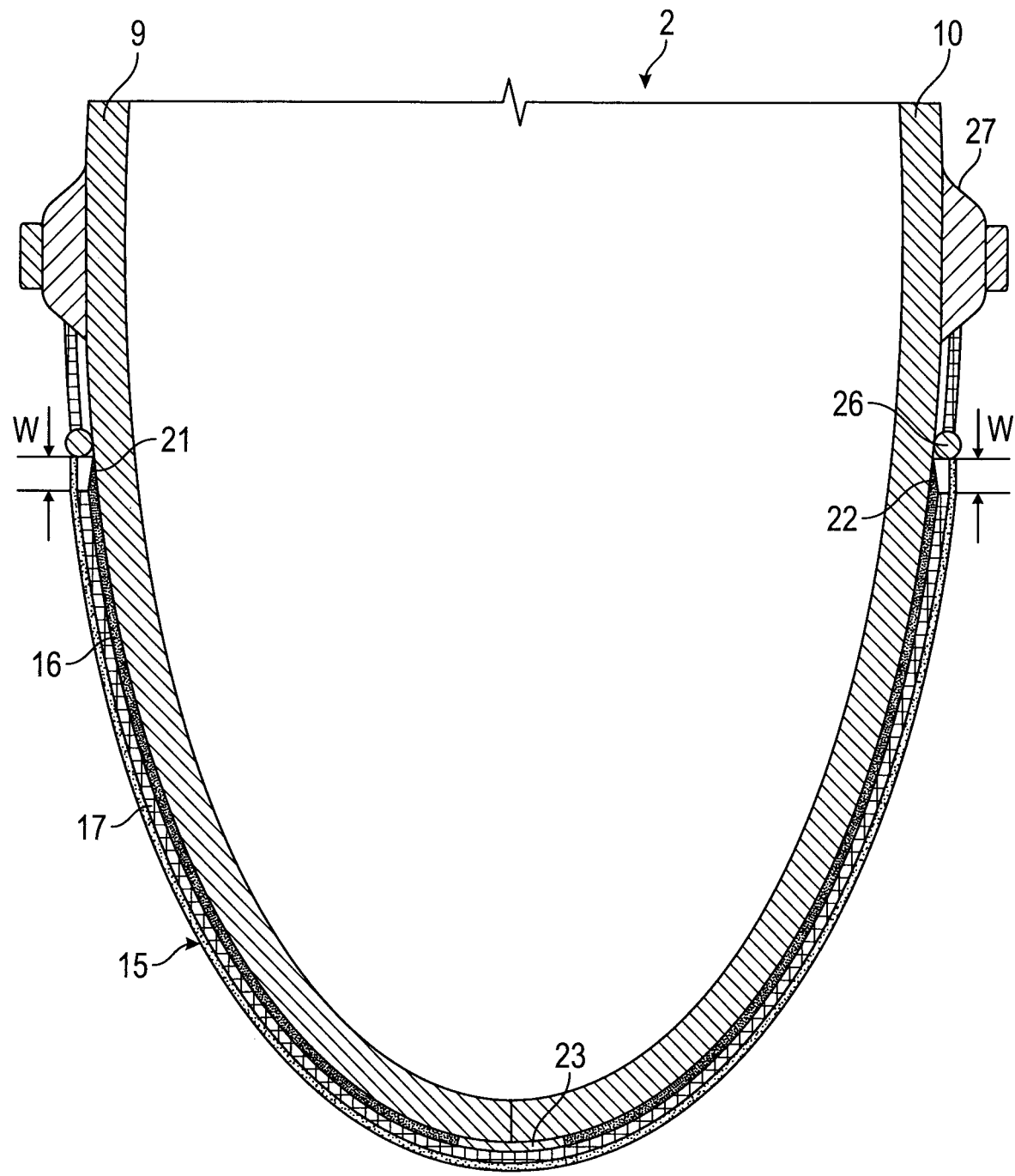
FIG. 6 is a cross-section through the wind turbine tip part illustrated in FIG. 5.

In the embodiment illustrated in FIGS. 5 and 6, a number of fixtures constituted by the heating devices 15 are arranged consecutively in the longitudinal direction D of the wind turbine blade 2 on the cover sections 17 adhered on said section of said wind turbine blade 2, thereby providing a surface pressure on the cover sections 17 during curing of the adhesive. The fixtures constituted by the heating devices 15 are consecutively arranged on the cover sections 17 of said section of the wind turbine blade 2 in pace with the consecutive application and adherence of the cover sections 17 on the longitudinal edge 3 of said section of the wind turbine blade 2. After expiration of a predetermined curing period from application of the first fixture on said section of said wind turbine blade 2, the fixtures are removed from the longitudinal edge 3 of said section of said wind turbine blade 2. The fixtures are preferably removed consecutively in the same order as they were applied, because the removal may then be initiated as soon as the adhesive of the firstly applied cover section 17 is cured, and therefore this procedure is most time efficient.

The predetermined curing period could for instance be about 4 hours in which the heating element are heated to a temperature of about 60 degrees Celsius. Alternatively, the predetermined curing period could for instance be about 6 hours in which the heating element are heated to a temperature of about 40 degrees Celsius.

As it may be understood, the fixtures constituted by the heating devices 15 are arranged before applying cover sections 17 on a section of a wind turbine blade 2, so that when a heating device 15 has been at least partly removed or detached from a position along the longitudinal edge 3 of a wind turbine blade 2 and one or more cover sections 17 have been adhered to the wind turbine blade 2 at said position, said heating device 15 is repositioned at at least substantially the same position again in order to support said one or more cover sections 17 during curing of the adhesive.

As illustrated in FIGS. 5 and 6, each fixture constituted by a heating device 15 is provided with a first group of attachment devices in the form of suction cups 27, which are adapted to be attached to a first surface of the wind turbine blade 2, and a second group of attachment devices, such as suction cups 27, which are adapted to be attached to a second surface of the wind turbine blade 2 situated oppositely with respect to the longitudinal edge 3 of the wind turbine blade 2. Said at least partly removal or detachment of the fixtures constituted by heating devices 15 from the longitudinal edge 3 of said section of the wind turbine blade 2 constitutes detachment of the second group of attachment devices from the second surface of the wind turbine blade 2. Preferably, the first group of attachment devices is maintained attached to the first surface of the wind turbine blade 2 during the application of the corresponding cover section 17 or sections on the wind turbine blade 2. Thereby, the application procedure may be simplified in that the service technician hanging in a rope does not have to completely remove and reposition the fixture constituted by a heating device, and it is therefore not necessary temporarily placing the fixture in a bag or the like. As a result, the application procedure may be even more time efficient.

In the illustrated embodiment, each attachment device is connected to the fixture constituted by a heating device 15 by means of an adjustable connection device, such as an adjustable strap 28. During positioning of the fixture, the fixture constituted by a heating device 15 is stretched at least substantially evenly over the respective cover sections 17 by suitable adjustment of some or all of the adjustable connection devices. Thereby, it may be achieved that a suitable evenly distributed surface pressure is applied on the cover sections during curing of the adhesive. Thereby, a stronger adhesion may be achieved.

In the embodiment of FIGS. 5 and 6, the fixture constituted by the heating device 15 is formed by a net 25 provided with a cord 26 at its opposed edges. By means of the adjustable straps 28, the cords 26 are connected to the suction cups 27. The net 25 is provided with a not visible heating element, thereby forming the fixture constituted by the heating device 15. Alternatively to a net, a preformed elastic shield may be applied with an integrated heating element. For instance, a preformed elastic shield could be formed from plastic, and suitable from foam. Alternatively to the suction cups 27, other devices could be employed, such as hooks gripping over an edge of the wind turbine blade 2 opposed to the longitudinal edge 3, adhesive tape or any other suitable attachment device.

Preferably, under standard weather conditions, the entire wind turbine blade part to be provided with cover sections 17 is provided with heating devices 15 before any cover sections 17 are adhered to said wind turbine blade 2.

Preferably, under severe weather conditions, on a number of the wind turbine blades 2, preferably all the wind turbine blades of the wind turbine 8, the entire wind turbine blade part to be provided with cover sections 17 is provided with heating devices 15 before any cover sections 17 are adhered to any of said number of the wind turbine blades 2. Thereby, an even longer preheating time for the wind turbine blades may be achieved, without waiting time for the service technician. Thereby, even in very cold climate and under harsh weather conditions, the entire application procedure may be carried out very fast and efficiently.

Preferably, under severe weather conditions, on a number of the wind turbine blades 2, preferably all the wind turbine blades of the wind turbine 8, the entire wind turbine blade part to be provided with cover sections 17 is provided with cover sections 17 and fixtures before any fixture is removed from any of said number of the wind turbine blades 2. Thereby, an even longer curing time for the adhesive may be achieved, without waiting time for the service technician. Thereby, even in very cold climate and under harsh weather conditions, the entire application procedure may be carried out even faster and more efficiently.

Advantageously, for each wind turbine blade 2, the first cover section 17 is positioned at the tip section of the wind turbine blade 2. Thereby, the first cover section 17 may be specifically formed to fit the tip section, and the firstly applied cover section 17 may therefore define the positions of the subsequently applied cover sections 17.

Figure 3:
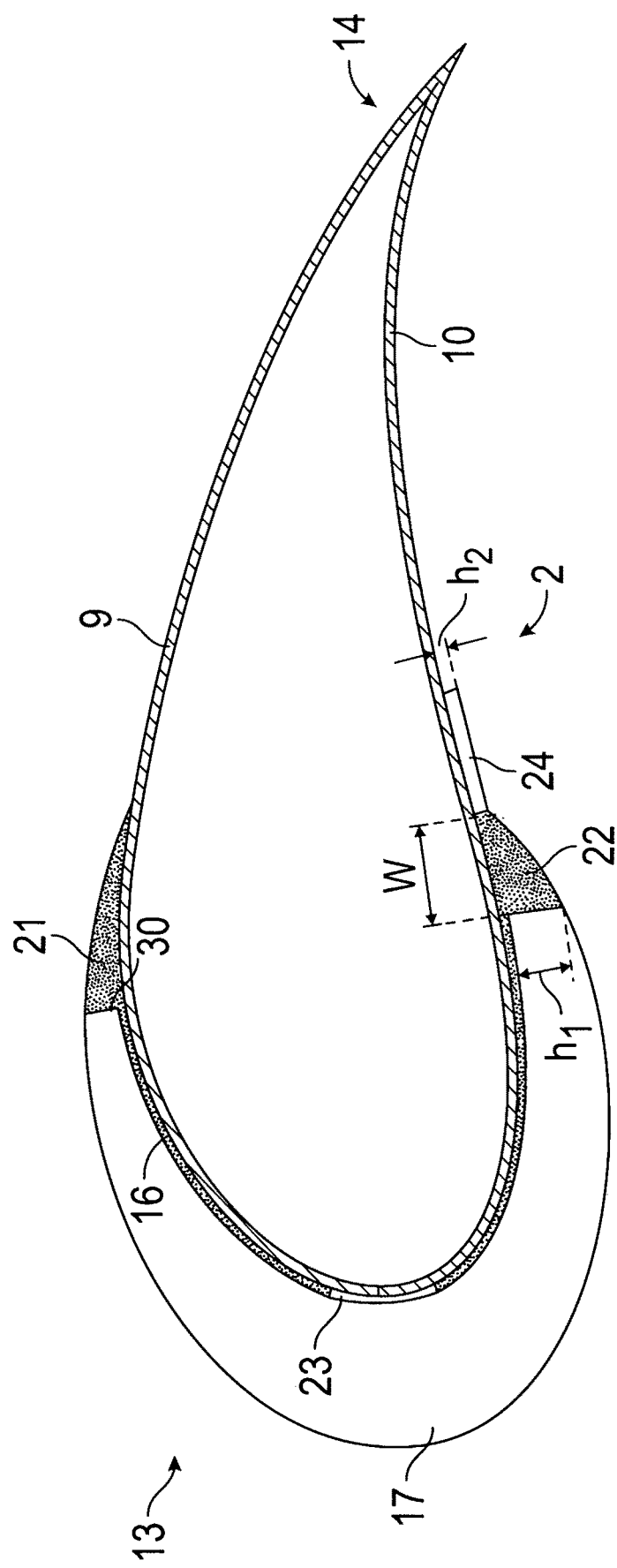
FIG. 3 illustrates a cross-section through a wind turbine blade and a protective cover after attachment to the wind turbine blade, the dimensions being greatly exaggerated.
Figure 4:
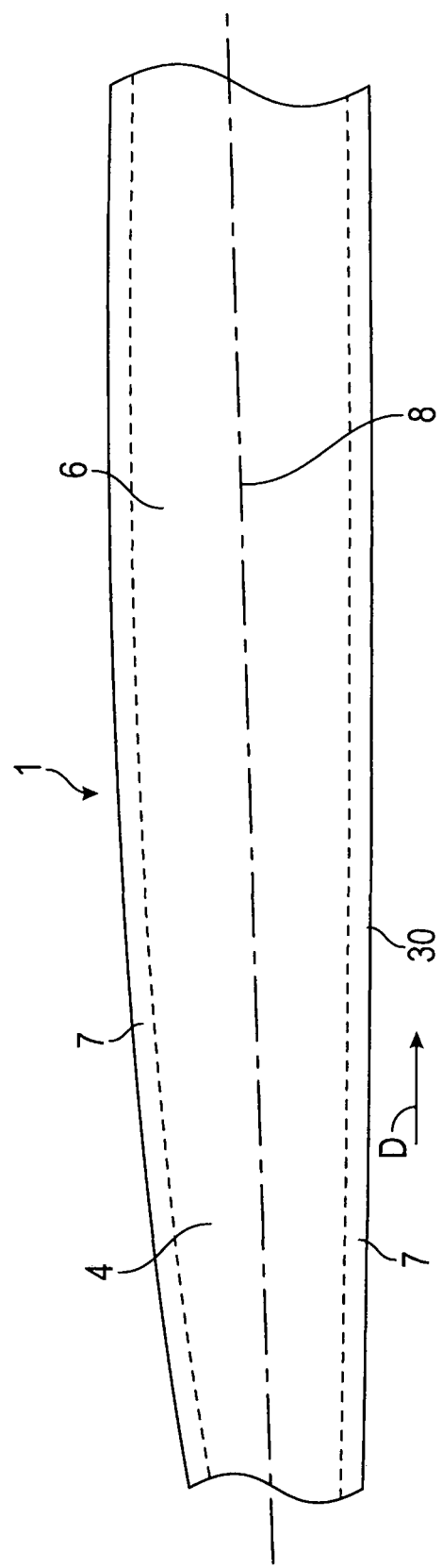
FIG. 4 illustrates the protective cover of FIG. 2 seen from its inside.

FIG. 3 illustrates the method according to the invention of applying a cover section 17 on a wind turbine blade. However, for illustrative purposes, the dimensions in FIG. 3 are greatly exaggerated. According to the method, the central cover section 6 has a minimum thickness of at least 1 millimetre, and each peripheral cover section 7 has a thickness decreasing from a maximum thickness of at least 1 millimetre to a minimum thickness at its outer edge 30 of less than 1 millimetre. The attachment procedure includes the following steps:
provided an adhesive, such as a two component epoxy adhesive, on an inside 4 of the protective cover 1,
pressing the inside 4 of the protective cover 1 against a surface 5 of the longitudinal edge 3 of the wind turbine blade 2,
removing excess adhesive leaking between each peripheral cover sections 7 and the surface 5 of the longitudinal edge 3 of the wind turbine blade 2, The adhesive is a general purpose adhesive, such as a two component epoxy adhesive, having thixotropic and UV resistant properties, and the attachment procedure includes the following steps:
before application of the protective cover 1 on the wind turbine blade 2, provisionally adhering a masking tape 24 on the surface 5 of the longitudinal edge 3 of the wind turbine blade 2 along and at a distance from the outer edge 30 of each peripheral cover section 7, the masking tape 24 having a thickness of less than 0.2 millimetres, preferably less than 0.1 millimetres,
after application of the protective cover 1 on the wind turbine blade 2, scraping excess adhesive leaking between each peripheral cover section 7 and the surface 5 of the longitudinal edge 3 of the wind turbine blade 2, and
removing the masking tape 24 from the surface 5 of the longitudinal edge 3 of the wind turbine blade 2.

Thereby, a very smooth transition from the surface of the protective cover 1 to the surface 5 of the longitudinal edge 3 of the wind turbine blade 2 may be achieved. In this way, it may be ensured that the flow characteristics of the wind turbine blade 2 is influenced to a minimum by the application of the protective cover 1. A suitable masking tape 24 may for instance be Magic Tape (Registered Trademark) available from 3M.

The minimum thickness at the outer edge 30 of each peripheral cover section 7 may be greater than 0.250 millimetres and may preferably be greater than 0.5 millimetres.

The distance of the provisionally adhered masking tape 24 from the outer edge 30 of each peripheral cover section 7 may be between 2 and 5 millimetres.

In an embodiment, before application of the protective cover 1 on the wind turbine blade 2, a first side of a double-sided adhesive transfer tape 23 is adhered to the inside 4 of the protective cover 1, and, before providing adhesive on the inside 4 of the protective cover 1, a second side of the double-sided adhesive transfer tape 23 is adhered to the surface 5 of the longitudinal edge 3 of the wind turbine blade 2. Thereby, the protective cover 1 may be positioned provisionally on the wind turbine blade 2 in the correct position, before the adhesive is applied.

In an embodiment, the first side of the double-sided adhesive transfer tape 23 is adhered to the inside 4 of the protective cover 1 at least substantially along a central axis of the protective cover 1.

The adhesive may be applied on the inside 4 of the protective cover 1 and/or on the surface 5 of the longitudinal edge 3 of the wind turbine blade 2 in that it is firstly applied at a first side in relation to the double-sided adhesive transfer tape 23 and secondly applied at a second side in relation to the double-sided adhesive transfer tape 23.

Before applying the adhesive at the second side of the double-sided adhesive transfer tape 23, the protective cover 1 may be pressed against the surface 5 of the longitudinal edge 3 of the wind turbine blade 2 at the first side of the double-sided adhesive transfer tape 23.

As seen in FIG. 3, the adhesive forms a joint 21, 22 or sealing between the outer edge 30 of each peripheral cover section 7 and the surface 5 of the longitudinal edge of the wind turbine blade 2 so that the outer edge 30 is at least substantially completely covered by the adhesive over its entire thickness and so that the joint 21, 22 or sealing forms an oblique surface from the outer edge 30 of each peripheral cover section 7 to the surface 5 of the longitudinal edge of the wind turbine blade 2. The joint 21, 22 or sealing has a first height $h_1$ at the outer edge 30 and a second height $h_2$ at the position where it 21, 22 ends at the surface 5 of the longitudinal edge of the wind turbine blade 2. The second height $h_2$ is smaller than the first height $h_1$ and smaller than 0.2 millimetres, preferably smaller than 0.1 millimetres. The joint 21, 22 or sealing is integrally formed with the layer 16 of adhesive arranged between the inside 4 of the protective cover and the surface 5 of the longitudinal edge of the wind turbine blade 2. Because the joint 21, 22 or sealing is integrally formed with the layer 16 of adhesive, the joint or sealing is much stronger attached to the protective cover 1 and the wind turbine blade 2 than would be the case, if the joint 21, 22 or sealing were applied as a separate joint in relation to the adhesive layer 16.

Because the adhesive used for the adhesive layer 16 has thixotropic and UV resistant properties, it may form a suitable joint 21, 22 or sealing being resistant to harsh weather conditions.

Preferably, the first height $h_1$ is greater than 0.250 millimetres and preferably greater than 0.5 millimetres.

Preferably, the joint 21, 22 or sealing has a width W from the outer edge 30 of the peripheral cover section 7 to the position where it 21, 22 ends at the surface 5 of the longitudinal edge of the wind turbine blade 2, and said width W is between 2 and 5 millimetres.

LIST OF REFERENCE NUMBERS

D longitudinal direction of wind turbine blade
W width of oblique joint
$h_1$ first height of oblique joint
$h_2$ second height of oblique joint
1 protective cover
2 wind turbine blade
3 longitudinal edge of wind turbine blade
4 inside of protective cover
5 surface of longitudinal edge of wind turbine blade
6 central cover section
7 peripheral cover section
8 existing wind turbine
9 first blade shell
10 second blade shell
11 first longitudinal joint at leading edge
12 second longitudinal joint at trailing edge
13 leading edge
14 trailing edge
15 heating devices
16 layer of adhesive
17 cover section
18 section of wind turbine blade
19 nacelle
20 service technician
21, 22 oblique joint
23 double-sided adhesive transfer tape
24 masking tape
25 net
26 cord
27 suction cup
28 adjustable strap
29 lightning protection
30 outer edge of peripheral cover section

The invention claimed is:

1. A wind turbine blade, comprising:
   a protective cover, wherein the protective cover is made of a polyether based polyurethane polymer material, wherein the protective cover is attached along at least a part of a longitudinal edge of the wind turbine blade by a layer of adhesive arranged between an inside of the protective cover and a surface of the longitudinal edge of the wind turbine blade;
   the protective cover being elongated in a longitudinal direction and having a U-formed cross-section;
   the protective cover including a central cover section extending in the longitudinal direction and two peripheral cover sections extending in the longitudinal direction at either side of the central cover section and each having an outer edge, respectively, wherein the central cover section has a minimum thickness of at least 1 millimetre, and wherein each peripheral cover section has a thickness decreasing from a maximum thickness of at least 1 millimetre to a minimum thickness at its outer edge of less than 1 millimetre; and
   the adhesive being a general purpose adhesive, wherein the adhesive forms a joint between the outer edge of each peripheral cover section and the surface of the longitudinal edge of the wind turbine blade so that the outer edge is at least substantially covered by the adhesive over its entire thickness and so that the joint forms an oblique surface from the outer edge of each peripheral cover section to the surface of the longitudinal edge of the wind turbine blade, wherein the joint has a first height at the outer edge and a second height at the position where it ends at the surface of the longitudinal edge of the wind turbine blade, wherein the second height is smaller than the first height and smaller than 0.2 millimetres, wherein the joint is integrally formed with the layer of adhesive arranged between the inside of the protective cover and the surface of the longitudinal edge of the wind turbine blade.

2. The wind turbine blade according to claim 1, wherein the first height is greater than 0.250 millimetres.

3. The wind turbine blade according to claim 2, wherein the first height greater than 0.5 millimetres.

4. The wind turbine blade according to claim 1, wherein the joint has a width from the outer edge of the peripheral cover section to the position where the joint ends at the surface of the longitudinal edge of the wind turbine blade, and wherein said width is between 2 and 5 millimetres.

5. The wind turbine blade according to claim 1, wherein a first side of a double-sided adhesive transfer tape is adhered to the inside of the protective cover, and wherein a second side of the double-sided adhesive transfer tape is adhered to the surface of the longitudinal edge of the wind turbine blade.

6. The wind turbine blade according to claim 5, wherein the first side of the double-sided adhesive transfer tape is adhered to the inside of the protective cover along a central axis of the protective cover.

7. The wind turbine blade according to claim 1, wherein the adhesive is-a two-component epoxy adhesive having thixotropic and UV resistant properties.

8. The wind turbine blade according to claim 1, wherein the second height is smaller than 0.1 millimetres.

9. The method according to claim 1, wherein the layer of adhesive arranged between the inside of the protective cover and the surface has a generally uniform thickness.

10. A method of providing a wind turbine blade with a protective cover, whereby the protective cover is made of a polyether based polyurethane polymer material, whereby the protective cover is attached along at least a part of a longitudinal edge of the wind turbine blade, whereby the protective cover is elongated in a longitudinal direction and has a U-formed cross-section, whereby the protective cover includes a central cover section extending in the longitudinal direction and two peripheral cover sections extending in the longitudinal direction at either side of the central cover section and each having an outer edge, respectively, whereby the central cover section has a minimum thickness of at least 1 millimetre, and wherein each peripheral cover section has a thickness decreasing from a maximum thickness of at least 1 millimetre to a minimum thickness at its outer edge of less than 1 millimetre, and whereby the attachment procedure includes the following steps:
providing an adhesive on an inside of the protective cover,
pressing the inside of the protective cover against a surface of the longitudinal edge of the wind turbine blade,
removing excess adhesive leaking between each peripheral cover sections and the surface of the longitudinal edge of the wind turbine blade,
wherein the adhesive is a general purpose adhesive, and by that the attachment procedure includes the following steps:
before application of the protective cover on the wind turbine blade, provisionally adhering a masking tape on the surface of the longitudinal edge of the wind turbine blade along and at a distance from the outer edge of each peripheral cover section, the masking tape having a thickness of less than 0.2 millimetres,
after application of the protective cover on the wind turbine blade, scraping excess adhesive leaking between each peripheral cover section and the surface of the longitudinal edge of the wind turbine blade, and
removing the masking tape from the surface of the longitudinal edge of the wind turbine blade.

11. The method according to claim 10, whereby the minimum thickness at the outer edge of each peripheral cover section is greater than 0.250 millimetres.

12. The method according to claim 11, wherein the first height greater than 0.5 millimetres.

13. The method according to claim 10, whereby the distance of the provisionally adhered masking tape from the outer edge of each peripheral cover section is between 2 and 5 millimetres.

14. The method according to claim 10, whereby, before application of the protective cover on the wind turbine blade, a first side of a double-sided adhesive transfer tape is adhered to the inside of the protective cover, and whereby, before providing adhesive on the inside of the protective cover, a second side of the double-sided adhesive transfer tape is adhered to the surface of the longitudinal edge of the wind turbine blade.

15. The method according to claim 14, whereby the first side of the double-sided adhesive transfer tape is adhered to the inside of the protective cover along a central axis of the protective cover.

16. The method according to claim 15, whereby the adhesive is applied on the inside of the protective cover or on the surface of the longitudinal edge of the wind turbine blade in that it is firstly applied at a first side in relation to the double-sided adhesive transfer tape and secondly applied at a second side in relation to the double-sided adhesive transfer tape.

17. The method according to claim 16, whereby before applying the adhesive at the second side of the double-sided adhesive transfer tape, the protective cover is pressed against the surface of the longitudinal edge of the wind turbine blade at the first side of the double-sided adhesive transfer tape.

18. The method according to claim 10, wherein the adhesive is a two-component epoxy adhesive having thixotropic and UV resistant properties.

19. The method according to claim 10, wherein the second height is smaller than 0.1 millimetres.

20. A method of repairing a damaged wind turbine blade having a longitudinal edge, comprising the steps of:
providing a protective cover made of a polymer material, the protective cover being elongated in a longitudinal direction and having a U-formed cross-section, the protective cover including a central cover section extending in the longitudinal direction and two peripheral cover sections extending in the longitudinal direction at either side of the central cover section and each having an outer edge, respectively, whereby the central cover section has a minimum thickness of at least 1 millimetre, and wherein each peripheral cover section has a thickness decreasing from a maximum thickness of at least 1 millimetre to a minimum thickness at its outer edge of less than 1 millimetre;

providing a layer of adhesive on an inside of the protective cover;

pressing the inside of the protective cover against a surface of the longitudinal edge of the wind turbine blade; and forming a joint from the adhesive, integral with the layer of adhesive between the inside of the protective cover and the surface of the blade, between the outer edge of each peripheral cover section and the surface of the wind turbine blade, each joint at least substantially covering the respective outer edge over its entire thickness and forming an oblique surface from the respective outer edge to the surface of the wind turbine blade, each joint having a first height at the respective outer edge and a second height at a position where the joint ends at the surface of the wind turbine blade, the second height being smaller than the first height and smaller than 0.2 millimetres;

whereby the protective cover is attached along at least a part of a longitudinal edge of the wind turbine blade.

21. The method according to claim 20, further comprising, before the pressing step, machining an area of the surface of the longitudinal edge of the wind turbine blade corresponding to the protective cover.

* * * * *